UNITED STATES PATENT OFFICE.

HENRY DREYFUS, OF BASEL, SWITZERLAND.

PROCESS OF MAKING CELLULOSE ACETATE INSOLUBLE IN CHLOROFORM AND IN CHLOROFORM-ALCOHOL.

1,280,975. Specification of Letters Patent. Patented Oct. 8, 1918.

No Drawing. Application filed June 15, 1916. Serial No. 103,862.

*To all whom it may concern:*

Be it known that I, HENRY DREYFUS, a citizen of the Republic of Switzerland, residing at Basel, Switzerland, have invented Processes of Making Cellulose Acetate Insoluble in Chloroform and in Chloroform-Alcohol, of which the following is a specification.

In my U. S. Patent Reissue No. 14,338 of July 31, 1917, I have described a process of producing esters of cellulose which are insoluble in chloroform, but soluble (and preferably easily soluble) by the addition of alcohol to the chloroform; also I have described the methods of transforming these products into products having other solubilities, by a later treatment, as described in my patent application 782,530, Aug. 1, 1913 (now Patent No. 1,217,722).

According to the present invention I have found that there exist also acetates of cellulose, insoluble in chloroform, which by the addition of alcohol to the chloroform do not dissolve, even when warm, although they in some cases become plastic or semi-fluid.

These new products are obtained if in the acetylation process, (for example using sulfuric acid as a condensing agent,) the acetylating mixture is cooled to a temperature as low as possible before introducing the cellulose to be acetylated, and if the temperature is not thereafter allowed to rise above about 20 or 25° C. and if the reaction is interrupted at the time when a test portion of the nearly clear solution demonstrates the insolubility in chloroform on addition of alcohol. In case one allows the temperature to rise above 20 or 25° C., products insoluble in chloroform will be obtained but these products are also soluble in alcohol-chloroform, and constitute for example products of my U. S. Patent 1,181,857.

I have found that the new products which are insoluble both in chloroform alone and with the addition of alcohol thereto, (which products are described and claimed in, and can be made according to the process described and claimed in my U. S. Patent application Serial No. 25,820 filed May 4, 1915) can be transformed in the same manner which is indicated in French Patent 432,046 and its additions (and by my U. S. application Serial No. 782,530) into products having other solubilities, if one submits the said products to a later treatment, in their original acetylation solution, or in other appropriate solutions, with or without the addition of water, or acids or acid salts (or a mixture of two or more of these) and finally in interrupting the reaction at the different phases, where the desired solubilities exist. The details of the process, concerning the addition of water in certain proportions or other similar bodies, or the changes brought about by the addition of acids, such as sulfuric acid, etc., are given in my U. S. application 782,530 (now Patent No. 1,217,722), and accordingly it is not necessary to repeat the same here.

By this later treatment, one is able to obtain certain acetates of cellulose which even by the subsequent treatment do not become soluble in pure acetone, but remain as the products of departure, soluble only in diluted acetone, while others possess a solubility in pure acetone.

On the other hand in employing other condensing agents instead of sulfuric acid, it is evident that the limits of temperature can be changed, and that for certain condensing agents, it is necessary even to apply heat for producing a reaction product having these properties.

As a specific example of the invention, to which the scope of the invention is not limited, the following is given.

An acetylating mixture is prepared by mixing 400 parts of glacial acetic acid and 300 parts of acetic anhydrid, and adding 15 to 18 parts of concentrated sulfuric acid. The said solution is then cooled as low as possible preferably to a temperature of 0° C. and while at this temperature 100 parts of cellulose (for example cotton) containing for example 3 to 5% of moisture are added thereto, preferably while agitating, and the generation of heat by the reaction is conveniently regulated, for example maintaining the temperature of the reaction mixture as low as possible, during the introduction of the cellulose, say below 5° C., and preferably as low as 0° C., and only thereafter allowing the temperature to rise somewhat, but not to temperatures above 20° C., preferably (and in any case not over 25° C.), until the cellulose has gone into solution.

The reaction is allowed to proceed, and is interrupted at that stage of the process at which the solution contains a cellulose acetate insoluble in chloroform alone (as determined by testing a precipitated test portion of the acetate), and likewise insoluble in a mixture of chloroform and alcohol, when the reaction can be stopped, and a cellulose acetate having the above properties as to solubility can then be precipitated by introduction of the reaction mixture containing the cellulose acetate in the original acetylating solution, into a large volume of cold water. The precipitated cellulose acetate will then be washed, pressed and dried, in the usual manner. If, however, one allows the reaction to go on further, or allows the same to go on at higher temperatures, then a cellulose acetate insoluble in chloroform but soluble therein upon the addition of alcohol, would be obtained.

The original acetylizing solution, may, instead of precipitating the cellulose acetate be treated with water or aqueous solutions, the amount of water being about 5%, 10%, 30%, 50%, or even more, (based upon the amount of cellulose employed) and the solution then allowed to stand, either with or without agitation, until the desired solubilities are produced, at which time the cellulose acetate is precipitated from the solution, for example by the addition of the said solution to a large volume of cold water, while agitating, and the cellulose acetate thus precipitated, washed, pressed and dried in the well known manner. During the treatment of the original cellulose acetates, by subjecting the same, while in the original acetylizing solution or equivalent solutions to the action of water or equivalent substances, the solubilities progressively change, the products becoming successively more and more soluble up to a certain point in particular solvents, after which in many cases the solubilities then gradually or rapidly decrease, and in some instances entirely disappear. The length of time usually necessary to produce a given result will ordinarily depend upon a number of factors, such as the temperature, the amount of water or equivalent materials added, the amount of acid in the solution, and particularly the amount of mineral acid in the solution, and the particular manner in which the original cellulose acetate has been produced, but the results of this treatment are similar to the result of the treament described and claimed in my copending application 782,530, filed August 1, 1913 (now Patent 1,217,722).

The present application is in part a continuation of matter disclosed in my copending application 25,820, filed May 4, 1915.

I do not herein claim broadly the cooling of the acetylating solution at least down to 5° C., and then adding the cellulose thereto, such process being claimed in my copending application, Serial No. 52,297, filed September 23, 1915.

What I claim is:—

1. A process of making cellulose acetate insoluble in chloroform and insoluble in alcohol-chloroform, which comprises subjecting cellulose to the action of an acetylizing solution comprising glacial acetic acid, acetic anhydrid and sulfuric acid, which solution is previously cooled to below 0° C., and which solution is maintained at temperatures below 25° C., until the cellulose has been dissolved.

2. A process of making cellulose acetate insoluble in chloroform and insoluble in alcohol-chloroform, which comprises subjecting cellulose to the action of an acetylizing solution comprising glacial acetic acid, acetic anhydrid and a suitable condensing agent, which solution is previously cooled to below 0° C. to produce a cellulose acetate which is insoluble both in chloroform and in chloroform-alcohol, but soluble in acetone, and allowing the reaction to proceed at temperatures maintained not above 20° C. until the cellulose has been dissolved and products insoluble in said two reagents produced, and interrupting the reaction while a test portion shows said insolubility in chloroform and in alcohol-chloroform.

3. A process of making cellulose acetate, which comprises subjecting cellulose to the action of an acetylizing solution comprising glacial acetic acid, acetic anhydrid and sulfuric acid, which solution is previously cooled to below 0° C., and which solution is maintained at temperatures below 25° C., until the cellulose has been dissolved and products insoluble in chloroform and in alcohol-chloroform produced, and thereafter allowing the reaction mass to stand in presence of water for the accomplishment of further reaction, until other desired solubilities appear, the quantity of water present having an effect upon the solubilities developed, and then interrupting the said further reaction at a time when such desired solubilities exist.

4. A process of making a cellulose acetate, which comprises first cooling an acetylating mixture to a temperature of not appreciably above 0° C., introducing the cellulose into said mixture while maintaining a temperature below about 20° C. for some time after the cellulose has been introduced into the solution, then allowing the temperature to rise slowly, while maintaining it not above 20° C., until the cellulose has been dissolved and products insoluble in chloroform and in alcohol-chloroform produced, and thereafter allowing the reaction mixture to stand in presence of water until other desired solubilities appear, the quantity of water present having an effect upon the solubilities developed, and then interrupting the reaction.

5. A process of making cellulose acetate insoluble in chloroform and insoluble in alcohol-chloroform, which comprises subjecting cellulose to the action of an acetylizing solution comprising glacial acetic acid, acetic anhydrid and sulfuric acid, which solution is previously cooled to below 0° C., and which solution is maintained at a temperature below 25° C., allowing the reaction mixture to stand and interrupting the acetylating reaction during the time when a test portion shows the insolubility in chloroform and the insolubility in alcohol-chloroform.

In testimony whereof, I have hereunto subscribed my name.

HENRY DREYFUS.

Witness:
ARNOLD ZUBER.